United States Patent
Chu et al.

(10) Patent No.: US 7,977,840 B2
(45) Date of Patent: Jul. 12, 2011

(54) STATOR WINDING FOR A SLOTLESS MOTOR

(75) Inventors: Jun Jie Chu, Hong Kong (CN); Xiao Peng Ma, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 27 days.

(21) Appl. No.: 12/352,180

(22) Filed: Jan. 12, 2009

(65) Prior Publication Data

US 2009/0179515 A1 Jul. 16, 2009

(30) Foreign Application Priority Data

Jan. 11, 2008 (CN) .......................... 2008 1 0065047

(51) Int. Cl.
*H02K 3/00* (2006.01)
*H02K 3/28* (2006.01)
*H02K 1/06* (2006.01)
*H02K 15/00* (2006.01)
*H01F 7/00* (2006.01)

(52) U.S. Cl. ........ 310/179; 310/184; 310/195; 310/198; 310/207; 310/208; 310/216.002; 310/216.003; 310/216.005; 29/596; 29/605

(58) Field of Classification Search .......... 310/179–180, 310/184, 195, 198, 207, 208, 216.002, 216.003, 310/216.005, 203; 29/596, 605
See application file for complete search history.

(56) References Cited

U.S. PATENT DOCUMENTS

| 2,759,116 | A | | 8/1956 | Glass |
| 3,441,761 | A | | 4/1969 | Painton et al. |
| 3,831,267 | A | | 8/1974 | Onishi et al. |
| 4,130,769 | A | | 12/1978 | Karube |
| 4,463,276 | A | | 7/1984 | Nakamura |
| 5,197,180 | A | | 3/1993 | Mihalko |
| 6,323,427 | B1 | * | 11/2001 | Rutledge ............... 174/113 R |
| 6,791,224 | B1 | * | 9/2004 | Ozawa et al. ............... 310/179 |

FOREIGN PATENT DOCUMENTS

| CN | 2143022 Y | 9/1993 |
| EP | 0694227 B1 | 5/1997 |
| WO | WO 2008085466 A1 * | 7/2008 |

\* cited by examiner

*Primary Examiner* — Quyen Leung
*Assistant Examiner* — Jose A Gonzalez Quinones
(74) *Attorney, Agent, or Firm* — Muncy, Geissler, Olds & Lowe, PLLC

(57) ABSTRACT

A stator winding for a slotless motor is formed by winding a magnet wire 22 into a single layer coil 24. The coil 24 is deformed e.g., by pressing, to form a double layer web 26 which is rolled up end to end to form a cylindrical stator winding 20. The coil 24 is divided into a number of phase windings 27 extending between connection tappings 25. The magnet wire 22 is a multi-core magnet wire formed from a plurality of core wires 23. Each core wire 23 is an insulated single core wire. Optionally the core wires are twisted together. The core wires 23 are electrically connected together at the connection tappings 25 to form a plurality of parallel electrical paths or sub-windings.

11 Claims, 3 Drawing Sheets

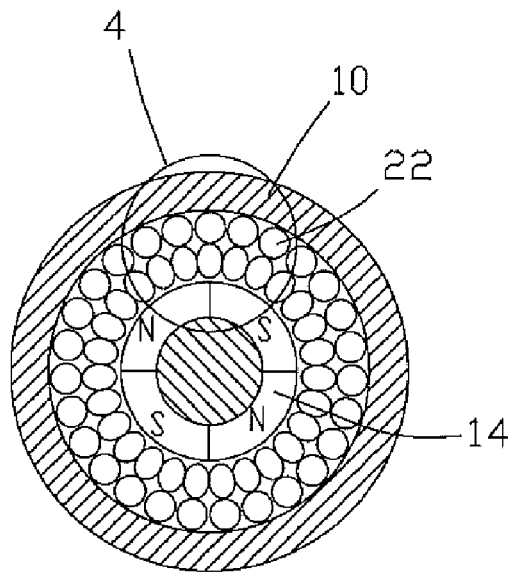
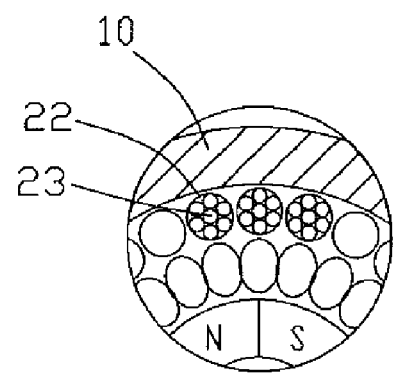
FIG. 3    FIG. 4
FIG. 5

STATOR WINDING FOR A SLOTLESS MOTOR

CROSS REFERENCE TO RELATED APPLICATIONS

This non-provisional patent application claims priority under 35 U.S.C. §119(a) from Patent Application No. 200810065047.0 filed in The People's Republic of China on Jan. 11, 2008.

FIELD OF THE INVENTION

The present invention relates to electric motors, and in particular to a stator winding for a slotless motor, especially a BLDC motor.

BACKGROUND OF THE INVENTION

Various motors are widely used in many different applications. With the development of power electronics, brushless direct current (BLDC) motors are being used in more and more applications especially in the fields of office automation, home appliances, automotive accessories, etc., for its simple structure, reliable electromagnetic performance, and low maintenance requirements.

Currently, many BLDC motors are slotted motors, and the stator of slotted motors usually comprises many teeth and slots of regular distribution, located in radial direction along its internal circumference, with the teeth and slots extending along the whole axial length of the stator. Using various techniques well known by those skilled in the art, the stator winding is embedded into the slots according to a certain phase order. However, this kind of slotted motor has the disadvantages of slot effect, magnetic hysteresis loss, eddy current loss, magnetic saturation, being inconvenient to wind, etc.

Slotless motors were developed as an alternative to slotted motors, as described for example, in U.S. Pat. No. 5,197,180. In a slotless motor the winding, which may be the stator or the rotor, is formed by winding a single core insulated wire (referred to as magnet wire) about a frame to form a hollow coil having multiple turns. A number of connection tappings may be formed between groups of the turns to form the phase windings. The frame is removed and the coil is pressed or flattened to form a double layer web of magnet wire which is then rolled end to end to form a cylindrical structure. Although this slotless motor can solve some of the disadvantages of the slotted motors, it does have a disadvantage of high eddy current loss within the stator winding under high current, high speed operating conditions. This is due to the structure of the slotless motor.

FIG. 1 is a cross-sectional schematic view of a typical BLDC slotless motor. The motor has a stator core 10, a stator winding 20 formed by a coil of magnet wire 22 fixed to the stator core and a permanent magnet rotor 14. Lines 11 represent the magnet flux path though the stator and rotor. As shown in FIG. 1, the coil of the slotless motor is a part of the main magnetic circuit. The eddy current loss and the magnetic flux density produced in the coil, the alternating frequency of the magnetic flux and the diameter of the wire meet the following relationship: $P \propto (Bfd)^2$, wherein, P represents the eddy current loss produced in the coil, B represents the magnetic flux density of the magnetic field passing through the coil, f is the alternating frequency of the magnetic flux, and d represents the diameter of the magnet wire of the coil. So, when the slotless motor is used with high current, high rotating speed, and with the magnetic flux density of the magnetic field passing through the coil being comparatively large and the magnet wire being thick, the alternating frequency of the magnetic flux is high, producing comparatively large eddy current losses in the coil.

SUMMARY OF THE INVENTION

Hence there is a desire for a winding for a slotless motor which has less eddy current losses when operated under high current and high speed.

This is achieved in the present invention by using a multi-core magnet wire formed from a plurality of insulated core wires forming multiple parallel electrical paths.

Accordingly, in one aspect thereof, the present invention provides a stator winding for a slotless motor, the stator winding comprising a plurality of turns of a magnet wire with a number of phase windings being wound consecutively, wherein the magnet wire is a multi-core magnet wire formed with a plurality of core wires twisted together, each core wire having an insulated single strand core whereby the stator winding has a plurality of parallel electrical paths.

Preferably, the core wires are electrically connected together at each end of each phase winding.

Preferably, the stator winding is formed from the magnet wire being wound, flattened, and rolled.

According to a second aspect thereof, the present invention also provides a stator for a slotless motor, comprising a stator core, a stator winding fixed to the stator core and having a number of phase windings, the stator winding being formed by flattening and rolling into a cylindrical form a single layer coil of magnet wire, wherein the magnet wire is a multi-core magnet wire having a plurality of core wires, each core wire having an insulated single strand core whereby the stator winding has a plurality of parallel electrical paths.

Preferably, the core wires are electrically connected together at the ends of each phase winding.

Preferably, the core wires of the magnet wire are twisted together into a helical form.

Preferably, the phase windings are electrically connected together in a star or delta configuration.

According to another aspect thereof, the present invention provides a method of forming a stator winding for a slotless motor, comprising the steps of:
1) twisting together a plurality of insulated core wires to form a magnet wire having a plurality of electrical paths; and
2) winding the magnet wire into a single layer coil and deforming the coil to form the stator winding.

Preferably, step 2) comprises:
i. winding the magnet wire about a frame to form the single layer coil;
ii. deforming the coil into a substantially flat double layer web; and
iii. rolling the double layer web end to end to form the stator winding.

Preferably, the method also includes dividing the stator winding into a number of phase windings, wherein the core wires are electrically connected together at each end of each phase winding.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 3 is a cross sectional schematic diagram of a slotless motor incorporating the stator of FIG. 2.

FIG. 4 is an enlarged schematic view of a part of the motor of FIG. 3.

FIGS. 5, 6, 7 and 8 are schematic diagrams showing various steps in forming the stator of FIG. 2.

DESCRIPTION OF THE PREFERRED EMBODIMENT

Figure 1:
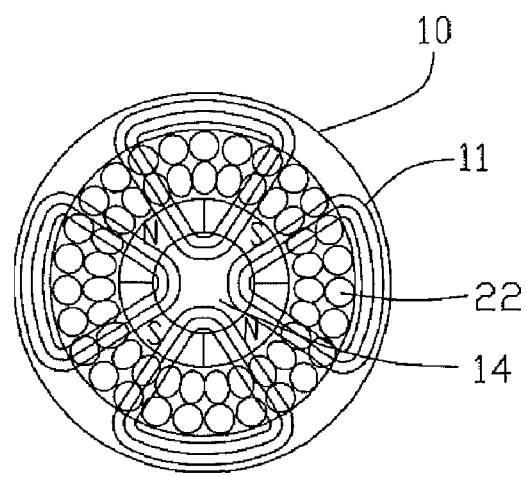
FIG. 1 is a schematic diagram of the main magnetic circuit of the cross section of a slotless motor.
Figure 2:
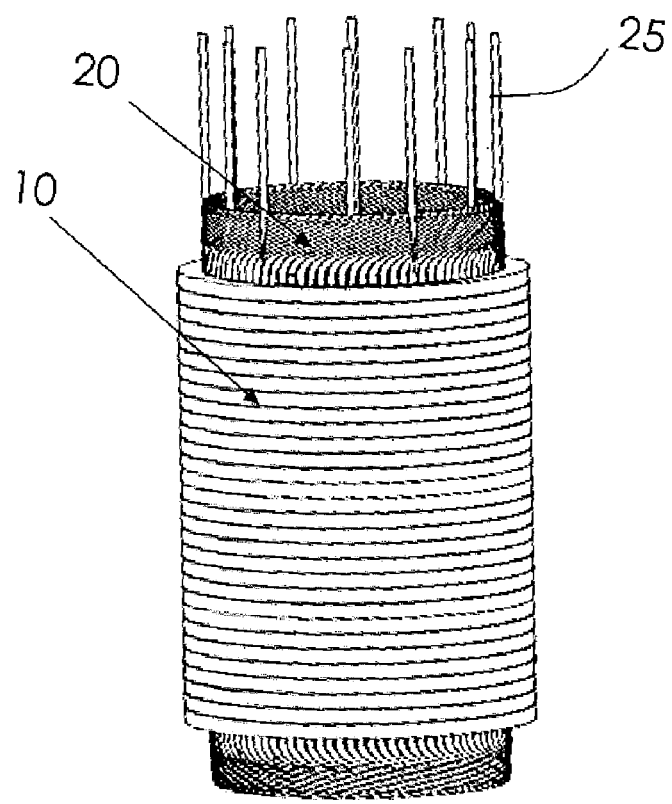
FIG. 2 is a perspective view of a stator of a slotless motor according to a preferred embodiment of the present invention.

FIGS. 2 to 4 illustrate the stator structure of a slotless motor according to the preferred embodiment of the present invention. FIG. 2 is a perspective view of the stator, comprising a cylindrical stator core 10 and a stator winding 20 fixed inside the core. The core 10 is formed by stacking together a number of stamped laminations of electrical steel. The winding 20 is formed in the usual manner except that the single core magnet wire of the prior art is replaced by a bundle of single core insulated wires forming a multi-core magnet wire 22. The magnet wire 22 is formed from multiple insulated wires, known as core wires 23, which are twisted together into a helical form. Each of the core wires 23 has an insulated single strand core, preferably of copper. The ends of the core wires 23 are electrically connected together, so as to form multiple parallel electrical paths or separate sub-windings within the coil.

The coil is separated into sections with tapped out connections 25 being formed at the time the coil is wound. These sections form the phase windings 27 for the different phases of the motor. The phase windings may be connected in Star or Delta configuration depending on the requirements of the motor. In the present embodiment, the winding 20 is formed with six phase windings 27, and the magnet wire 22 is formed from six core wires 23, as shown in FIG. 5. As an alternative example, in FIG. 4, the magnet wire is shown formed by 7 core wires.

According to the relationship between the eddy current loss and magnetic flux density produced in the coil, alternating frequency of the magnetic flux and the magnet wire diameter, as mentioned above, the stator winding of the present invention, when used in a high current and high rotating speed application, can effectively reduce the eddy current loss produced in the winding 20. The comparatively small diameter of the core wires compared to the diameter of a single core magnet wire of similar current carrying capacity reduce the current carried in each wire. The parallel configuration of the core wires splits or shares the total current and the magnet flux of the stator winding. By twisting together the insulated core wires 23 into a helical form, we can avoid a potential difference being produced between different core wires 23, thus reducing the creation of circulating current which would otherwise lead to increased copper loss.

Figure 6:
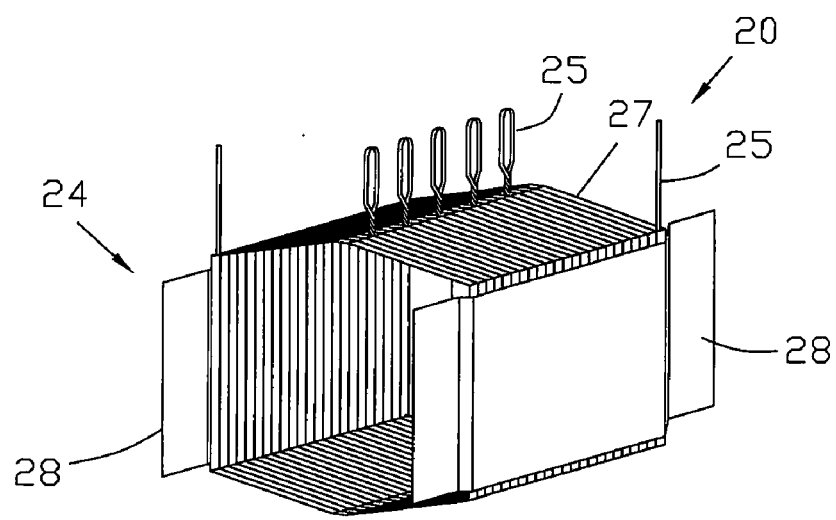
Figure 7:
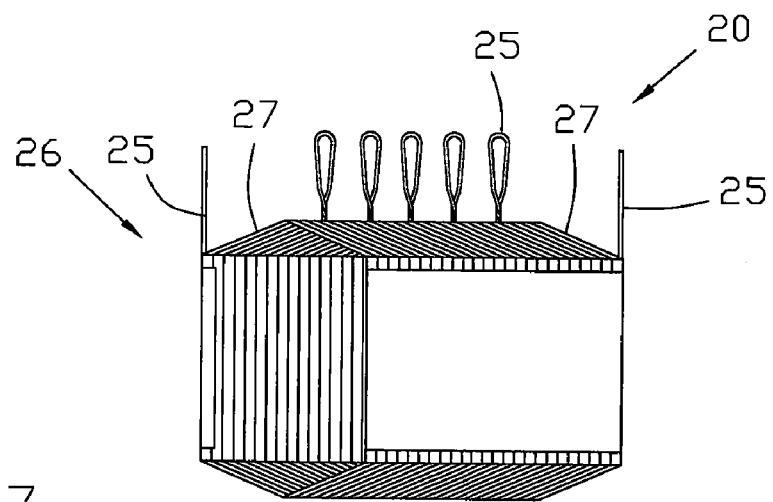

FIGS. 5 to 8, illustrate various steps in forming the stator winding. The method comprises following main steps:

1) multiple insulated core wires 23 are twisted together into a helical form to form the multi-core magnet wire 22;

2) The magnet wire 22 is wound about a bracket (not shown) to form a hollow single layer coil 24 as shown in FIG. 6. The coil 24 is divided into a number of phase windings 27 by connection tappings 25 used to connect the stator winding to the motor controller. At each end of the phase windings, as defined by the connection tappings, the core wires are electrically connected together to form the parallel paths. This connection may be by welding, soldering or fusing the core wires together or by a mechanical connection and is optionally made at the time of connecting the stator winding to the motor control circuit or controller. Optionally, adhesive tape 28 may be applied to sides of the coil to keep the turns of the magnet wire in place when the coil is removed from the bracket.

Figure 8:
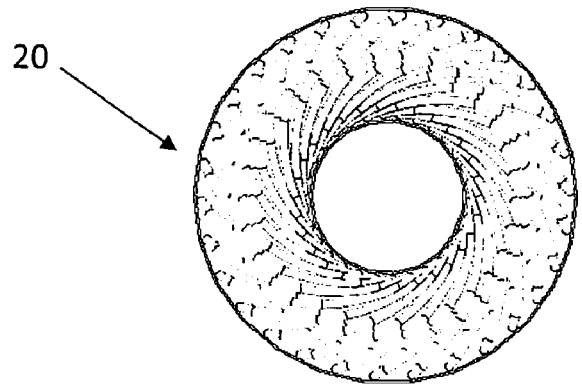

3) The coil 24 is then deformed into a basically flat double layer web 26 by pressing or flattening etc while maintaining the turns of the magnet wire next to each other. This is best described as a laying over of each turn of the coil 24;

4) The double layer web 26 is then rolled up to form the cylindrical stator winding 20. The ends of the web 26 meet to form a continuous double layer cylinder as shown in FIG. 8. The stator winding is then fixed inside the stator core to create the stator of FIG. 2.

The method of winding the stator of a slotless motor according to the present invention is similar to the conventional method except that before winding the magnet wire, the magnet wire is formed by twisting together a plurality of insulated core wires 23. Each of the core wires 23 have a single core with a comparatively small diameter and are twisted together to form a comparatively large diameter multi-core magnet wire 22. Thus the invention is not difficult to implement, and the subsequent operations of winding and shaping are convenient.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A stator winding for a slotless motor, the stator winding comprising a plurality of turns of a magnet wire with a number of phase windings being wound consecutively, wherein the magnet wire is a multi-core magnet wire formed with a plurality of core wires twisted together, each core wire having an insulated single strand core whereby the stator winding has a plurality of parallel electrical paths, the stator winding having a cylindrical shape with two opposite ends in an axial direction of the cylindrical shape, sections of the winding between the two ends being parallel to the axial direction.

2. The stator winding of claim 1, wherein the core wires are electrically connected together at each end of each phase winding.

3. The stator winding of claim 1, wherein the stator winding is formed from the magnet wire being wound, flattened, and rolled.

4. A stator for a slotless motor, comprising a stator core, a stator winding fixed to the stator core and having a number of phase windings, the stator winding being formed by flattening and rolling into a cylindrical form a single layer coil of magnet wire, wherein the magnet wire is a multi-core magnet wire having a plurality of core wires, each core wire having an insulated single strand core whereby the stator winding has a plurality of parallel electrical paths, the stator winding having a cylindrical shape with two opposite ends in an axial direction of the cylindrical shape, sections of the winding between the two ends being parallel to the axial direction.

5. The stator of claim 4, wherein the core wires are electrically connected together at the ends of each phase winding.

6. The stator of claim 4, wherein the core wires of the magnet wire are twisted together into a helical form.

7. The stator of claim 6, wherein the phase windings are electrically connected together in a star or delta configuration.

8. A method of forming a stator winding for a slotless motor, comprising the steps of:
  1) twisting together a plurality of insulated core wires to form a magnet wire having a plurality of electrical paths; and
  2) winding the magnet wire into a single layer coil and deforming the coil to form the stator winding, wherein step 2) comprises:
      i. winding the magnet wire about a frame to form the single layer coil;
      ii. deforming the coil into a substantially flat double layer web;
      iii. rolling the double layer web end to end to form the stator winding.

9. The method of claim 8, further comprising dividing the stator winding into a number of phase windings and electrically connecting together each of the core wires at each end of each phase winding.

10. The stator winding of claim 8, wherein the magnet wire has a circular cross section.

11. The stator winding of claim 1, wherein the multi-core magnet wire has a circular cross section.

\* \* \* \* \*